(12) United States Patent
Jeppesen

(10) Patent No.: US 6,355,995 B1
(45) Date of Patent: Mar. 12, 2002

(54) MOTOR COOLING SYSTEM

(75) Inventor: Gregory C. Jeppesen, Orchard Lake, MI (US)

(73) Assignee: J. W. I. of Howell, LTD, Orchard Lake, MI (US)

( * ) Notice: Subject to any disclaimer, the term of this patent is extended or adjusted under 35 U.S.C. 154(b) by 0 days.

(21) Appl. No.: 09/522,165

(22) Filed: Mar. 9, 2000

Related U.S. Application Data

(60) Provisional application No. 60/123,553, filed on Mar. 10, 1999.

(51) Int. Cl.[7] .............................. H02K 9/00; H02K 9/08
(52) U.S. Cl. .............................. 310/52; 310/58; 310/55
(58) Field of Search .............................. 310/52, 54, 55, 310/58, 59

(56) References Cited

U.S. PATENT DOCUMENTS

| | | | | |
|---|---|---|---|---|
| 721,877 A | * | 3/1903 | Fedeler | 310/58 |
| 994,810 A | * | 6/1911 | Westinghouse | 310/59 |
| 2,604,500 A | * | 7/1952 | De Koning | 171/252 |
| 3,675,056 A | | 7/1972 | Lenz | 310/54 |
| 3,819,965 A | | 6/1974 | Schoendube | 210/58 |
| 4,110,643 A | | 8/1978 | Müller | 310/54 |
| 4,180,946 A | | 1/1980 | Heijkenskjold et al. | 51/134.5 |
| 4,427,908 A | | 1/1984 | Halmai | 310/57 |
| 6,144,123 A | * | 11/2000 | Selci | 310/52 |

FOREIGN PATENT DOCUMENTS

| | | | | |
|---|---|---|---|---|
| FR | 419886 | * | 1/1911 | 310/52 |
| JP | 64-39246 | * | 2/1989 | 310/55 |
| JP | 2-228230 | * | 9/1990 | 310/52 |
| SU | 558356 | * | 6/1977 | 310/52 |
| SU | 881941 | * | 11/1981 | 310/54 |
| SU | 1432667 | * | 1/1987 | 310/59 |

* cited by examiner

*Primary Examiner*—Karl Tamai
(74) *Attorney, Agent, or Firm*—Dinnin & Dunn P.C.

(57) ABSTRACT

A motor cooling system 10 for and electric motor 20 having a rotor 60, mounted on a rotor shaft 62 rotatable about a central axis and a stator 70, comprises a fluid nozzle 100 extending through an aperture disposed in said motor 20 having an inlet 104 oriented to allow a compressed cooling fluid, preferably compressed air, to expand rapidly therefrom and direct said cooling fluid circumferentially around said motor 20 interior. A plurality of exhaust ports 120 are provided to maintain a positive pressure differential between upstream 80 and downstream 90 chambers of said motor 20, thereby enhancing cooling fluid flow through the rotor-stator gap 72.

10 Claims, 4 Drawing Sheets

MOTOR COOLING SYSTEM

CROSS-REFERENCE TO RELATED APPLICATIONS

The instant application for U.S. Letters Patent claims the benefit of copending U.S. Provisional Application Ser. No. 60/123,553, filed Mar. 10, 1999.

BACKGROUND OF THE INVENTION

The instant invention relates generally to cooling systems and more particularly to an air-cycle cooling system for an electric motor. Large electric motors, for example alternating current (AC) induction motors, generate tremendous amounts of heat as a result of the electromagnetic fields therein. The internal heat build-up significantly reduces the efficiency of the motor, particularly in high-density power applications. In electric motor applications heat is particularly undesirable due to the increase in electrical resistance through the motor windings associated with an increase in temperature. AC induction motors utilizing vector drives are particularly prone to heat build-up in the rotors thereof. The removal of this heat is required for efficient operation of the motor.

Known in the art motor cooling systems employ a variety of cooling methods including air fans and various liquid coolants, for example water or transmission fluid, circulated through jackets surrounding the motor frame. In these systems, heat builds up in the rotor and stator and radiates to the inner surface of the water jacket surrounding the motor. Water (or other industrial coolant such as liquid nitrogen) is continuously circulated throughout the water jacket surrounding the motor to dissipate heat from the interior surfaces thereof.

Conventional water jacket motor cooling systems can provide sufficient cooling for ordinary large motor applications, but motor efficiency is unimpressive. In high power density applications, a great deal of power that would otherwise translate into shaft horespower is lost due to heat build-up in the motor's rotor and stator. Vector drive motor control systems have a particular tendency to cause heat build-up in the rotor surfaces, thereby requiring heat to radiate outwardly through the stator thence to the water jacket interior surfaces. This results in a very poor heat transfer path and an inability to provide adequate motor cooling for high power density applications.

Additionally, known-in-the-art liquid cooling systems greatly increase the expense of a given motor application due to the necessity of providing a coolant supply, piping, temperature and pressure regulation, and the various labor and material costs associated therewith. Furthermore, the effects of chronic and excessive heat build-up are deleterious to electric motors. Exotic industrial coolants that prevent excessive heat build-up for very large motor applications can be cost prohibitive.

SUMMARY OF THE INVENTION

The aforementioned problems are solved by the cooling system and method of the present invention that provides a directed airflow to the interior of an electric motor to remove undesirable heat therefrom. The instant invention introduces cooling fluid, preferably compressed air through an end plate of an electric motor utilizing a nozzle, or a plurality thereof, disposed radially outwardly of the end turns of a stator.

The instant invention is designed to operate using "shop air", widely available in most industrial settings, as a preferred cooling fluid. The use of compressed air provides a tremendous cost savings by obviating the need for specialized liquid cooling systems in large motor applications. Additionally, the energy used by industrial compressors to supply "shop air", throughout an industrial plant is partially recovered by employing the air as a cooling fluid. The pressurized shop air is forced through a nozzle, or a plurality thereof, thence into the interior of an electric motor thereby creating a rapid pressure drop as the air enters a chamber in the motor. Since the volume of the compressed air exiting the nozzles is essentially constant, the gas law (PV=nRT) requires the air temperature to exhibit a proportional decrease.

The cool air exiting the nozzles is directed tangentially to the axis of the rotor at a plurality of points outwardly of the end turns of the stator. This cool, high velocity fluid travels through the channels formed by the looped electrical conductors inherent in conventional stator end turns, and is thereby directed radially inwardly across a rotor end disc, proximate the rotor shaft, and then into the slight air gap between the rotor and stator, thus efficiently removing heat from the both rotor and stator surfaces. The rotation of the rotor and a slight positive pressure maintained between the upstream and downstream ends of the motor provide for high velocity cooling fluid within the rotor-stator gap.

The cool air then travels inwardly across the end disk of the motor to transfer heat therefrom. The air then exits the motor through a plurality of exhaust ports disposed in a second motor end plate located opposite the drive end thereof. The exhaust ports are preferably sized to maintain a slight positive pressure differential between the chamber at the drive end of the motor and the chamber at the exhaust end thereof, depending upon the pressure of the cooling air supply. This positive pressure differential enhances the flow of cooling fluid through the rotor-stator gap, providing exceptional heat transfer. In one embodiment of the instant invention a plurality of exhaust ducts having inlets located radially outwardly of the stator end turns are disposed in fluid communication with the exhaust ports to direct the cooling fluid exiting the rotor-stator gap across and through the stator end turns, thereby enhancing overall heat transfer.

The instant invention is readily retrofitted to existing electric motor applications, requiring only several apertures to be bored in one end plate for installation of the plurality of nozzles, and an exhaust port or ports in the opposed end plate. In most industrial settings, compressed air to be used as cooling fluid is readily available via plant piping. The motor may be equipped with a water jacket or similar cooling apparatus that remains unused for purposes of the instant invention Therefore, one object of the instant invention is an inexpensive cooling system for conventional electric motors, of particular benefit in high power density applications.

Another object of the instant invention is a cooling system for an electric motor employing widely available "shop air" as a cooling fluid, thereby obviating the need for costly liquid cooling systems.

Another object of the instant invention is a cooling system for an electric motor that recovers a portion of the energy expended in the production of compressed air in industrial facilities.

Another object of the instant invention is a cooling system for an electric motor utilizing a plurality of fluid nozzles to direct cooling fluid to cool the rotor and stator thereof, thereby providing a dramatic increase in motor efficiency.

Another object of the instant invention is a cooling system for an electric motor that permits the operation thereof in extremely high power density applications, wherein conventional cooling systems fail.

Yet another object of the instant invention is a cooling system for an electric motor that utilizes the existing channels present in conventional stator end turns and motor windings as flow paths for cooling fluid, thereby affording exceptional heat transfer.

Yet another object of the instant invention is a cooling system for an electric motor that is readily installed in existing motor applications.

Additional objects, features, and advantages of the present invention will become apparent from the subsequent detailed description, taken in conjunction with the accompanying drawing figures.

DETAILED DESCRIPTION OF THE PREFERRED EMBODIMENTS

Figure 1:
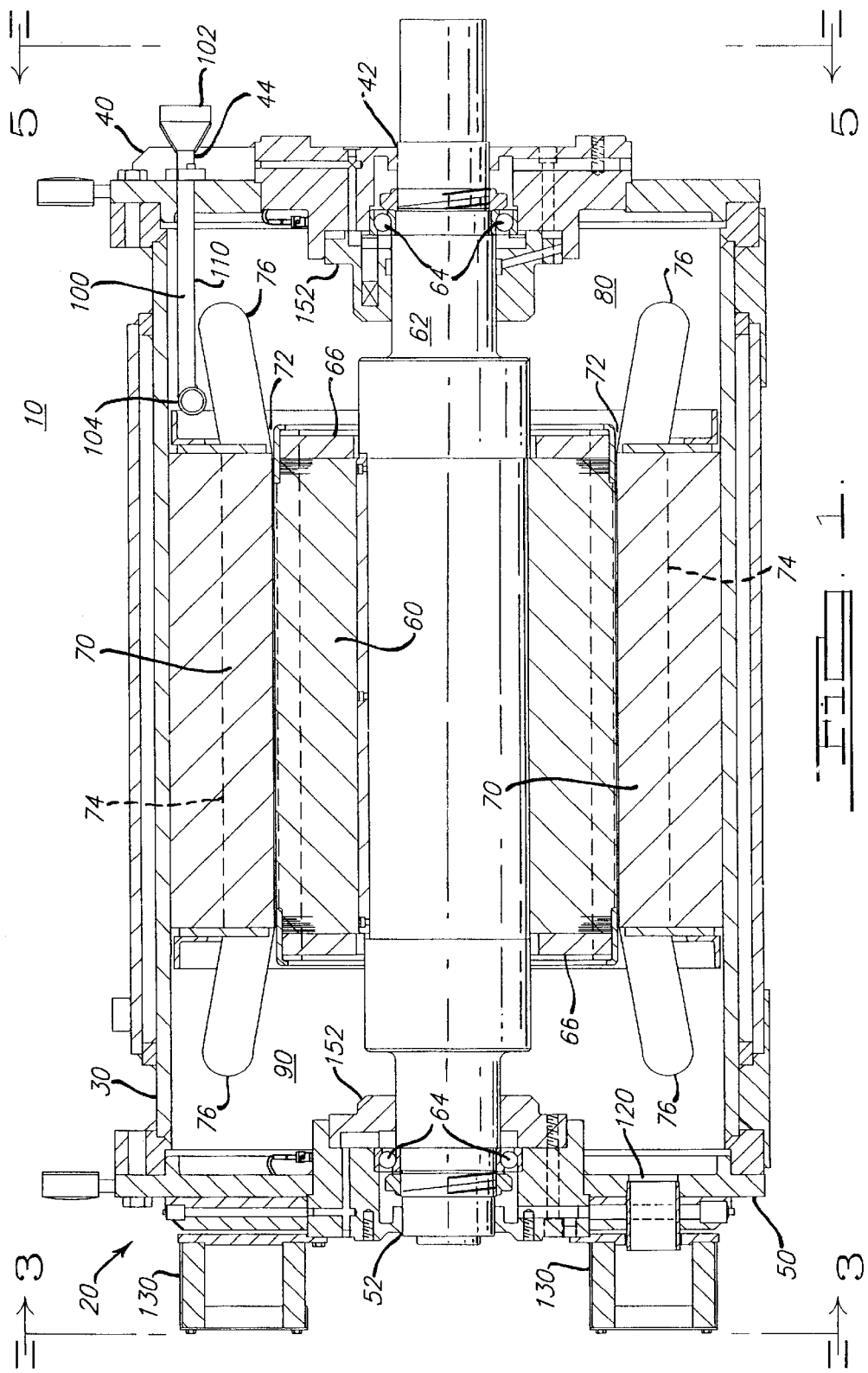
FIG. 1 is a cross-sectional view of an electric motor in accordance with the instant invention.

As shown in FIG. 1, and in accordance with a preferred constructed embodiment of the instant invention, a motor cooling system 10 is shown in operative association with a conventional alternating current (AC) induction motor 20, having a closed housing comprising a motor frame 30 and first and second opposed end plates 40 and 50 respectively, disposed at opposite ends of the motor frame 30. The motor 20 further comprises a conventional rotor 60 mounted on a shaft 62 journaled on bearings 64 and capable of rotation about a central axis. The rotor shaft 62 extends at either end through corresponding apertures 42 and 52 in the opposed end plates 40 and 50. The rotor further comprises a pair of opposed, generally circular end discs 66, disposed at opposite ends thereof.

The motor further comprises a conventional stator 70, secured to the motor frame 30 and disposed radially outwardly of the rotor 60 such that a small air filled gap 72 is present therebetween. The stator 70 is typically comprised of a plurality of generally circular steel laminated discs having a plurality of radially inwardly directed slots disposed therein. The plurality of discs are stacked together wherein the plurality of slots form a plurality of axial channels through which stator coils 74 comprised of a wire conductor pass. The coils 74 have a plurality of end turns 76 where the conductors are routed from one axial channel to another.

Due to the proximity of the rotor 60 and the stator 70 at the air gap 72, the interior of the motor is in essence divided into a pair of chambers, 80 and 90 respectively. Chamber 80, hereinafter the upstream chamber, is bounded by end plate 40 on a first side, the rotor 60 and stator 70 on a second side, and the motor frame 30 at the periphery. Similarly, chamber 90, hereinafter the downstream chamber, is bounded by end plate 50 on a first side, the rotor 60 and stator 70 on a second side, and the motor frame 30 at the periphery. While the instant invention is shown in operative association with an AC induction motor, it is adaptable for use with all varieties of electric motors.

Figure 2:
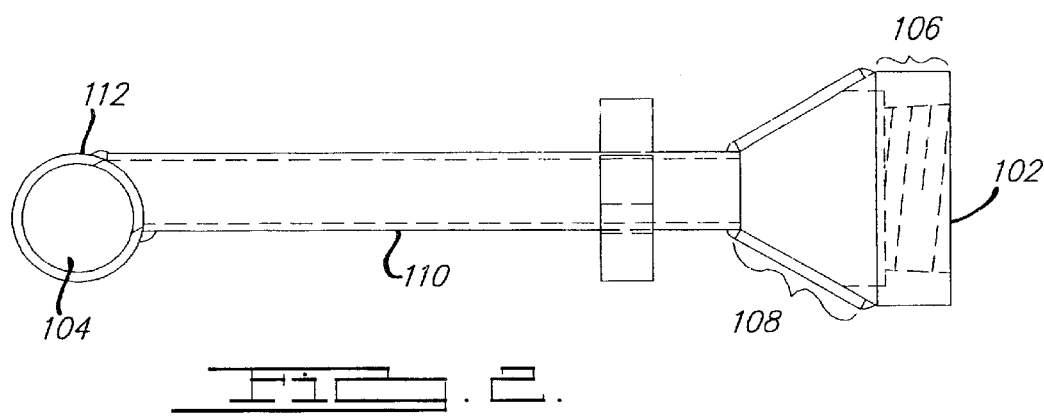
FIG. 2 is a perspective view of a cooling nozzle of the instant invention.

Referring to FIGS. 1 and 2, the motor cooling system 10 of the present invention comprises a nozzle 100 inserted through an aperture 44 in the first end plate 40 of the motor 20. The nozzle has an inlet 102 disposed externally of said motor 20 and an outlet 104 disposed internally thereof. The inlet 102 is designed to accept a cooling fluid for admission into the interior of the motor 20, specifically, compressed air as generated and readily available in most industrial settings. The outlet 104 is oriented to direct the cooling fluid circumferentially around the interior of the motor frame 30, proximate the end turns 76 of the stator 70.

As best seen in FIG. 2, the nozzle inlet 102 comprises a generally cylindrical portion 106 adapted to accept a source of cooling fluid, preferably compressed air, adjacent a conical portion 108 that tapers to a tubular portion 110 extending through the aperture 44 in the end plate 40. The tubular portion 110 has an angled section 112 therein to direct the cooling fluid circumferentially of the motor 20 as it exits the nozzle outlet 104.

Figure 3:
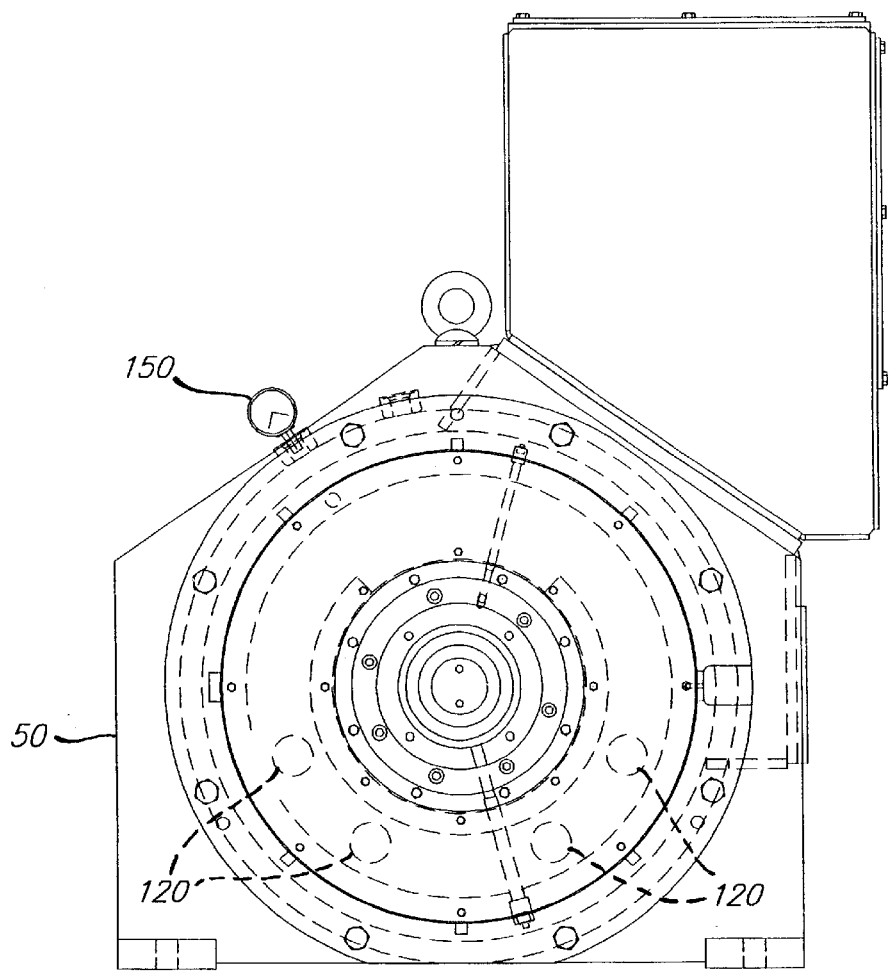
FIG. 3 is a view of the instant invention taken along the line 3—3 of FIG. 1.

The motor cooling system further comprises a plurality of exhaust ports 120, best seen in FIGS. 1 and 3, disposed in the second end plate 50 proximate the periphery thereof to facilitate the release of cooling fluid from the downstream chamber 90. Locating the exhaust ports 120 as far radially outwardly of the end plate 50 as practicable forces the cooling fluid to travel a greater distance prior to exiting the motor 20, thereby facilitating heat transfer. As shown in FIG. 1, the exhaust ports 120 are enclosed, at the exterior of the end plate 50, by a plurality of exhaust silencers 130 to reduce the ambient noise produced by the exhausted cooling fluid. The silencers 130 place no restriction on the volume of cooling fluid flowing through the exhaust ports 120. The exhaust silencers 130 may be utilized in applications requiring higher cooling fluid pressures, wherein the noise generated by the exhausted cooling fluid is undesirable or unsafe.

Figure 4:
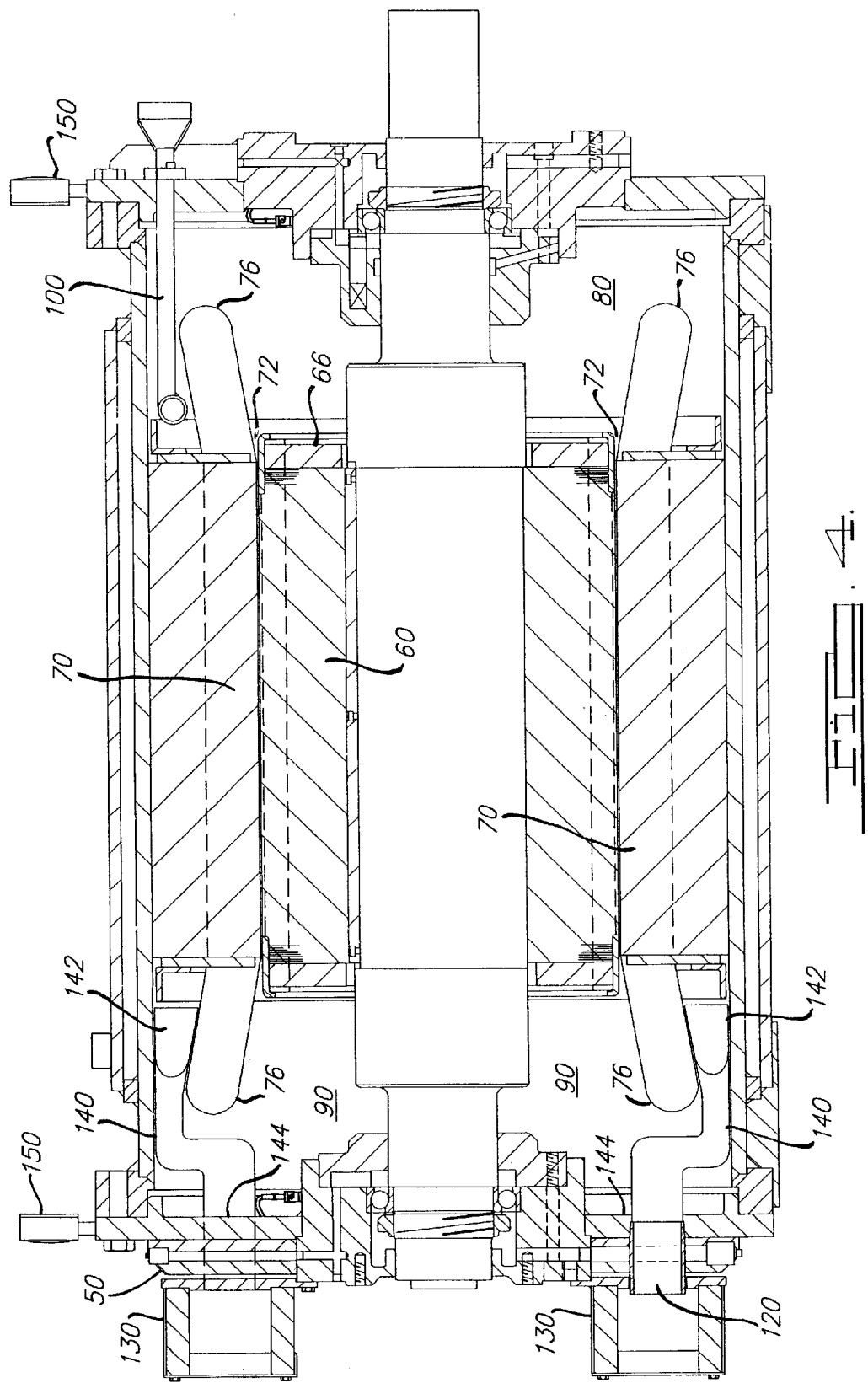
FIG. 4 is a cross-sectional view of an electric motor in accordance with an alternate embodiment of the instant invention.

In an alternative embodiment of the instant invention as shown in FIG. 4, a plurality of exhaust ducts 140 having inlets 142 located radially outwardly of the end turns 76 of the stator 70 and outlets 144 in fluid communication with the exhaust ports 120 direct the cooling air to exit the motor 20 proximate the end turns 76 thereof. This feature confers particular advantage to the cooling capacity of the system 10 by initiating a fluid flow path in the downstream chamber 90 radially outwardly proximate the rotor end disc 66, around the end turns 76 of the stator 70, proximate the rotor shaft 62, thence outwardly to the exhaust ducts 140, wherein the boundary layer of cooling fluid remains turbulent, thereby providing exceptional heat transfer from the aforementioned motor surfaces to the cooling fluid prior to exhaust.

In another alternative embodiment, the exhaust ports 120 are sized to have a total cross-sectional area that provides a positive pressure differential between the upstream chamber 80 of the motor 20 and the downstream chamber 90 thereof, for a given pressure of cooling air introduced via the nozzle 100. This feature of the invention maintains a positive pressure differential between the chamber 80 and the chamber 90 wherein cooling fluid exiting the channels formed by the end turns 76 of the stator 70 is drawn into the gap 72 between the rotor 60 and the stator 70. The rotation of the rotor 60 adds a tangential component to the cooling fluid flow path, thereby creating a helical fluid flow path through the rotor-stator gap, wherein the cooling fluid attains very high velocity. This "ramjet effect" flow path through the rotor-stator gap 72 enhances heat transfer to the cooling fluid while obviating the need to drive heat from the rotor 60 through the stator 70 prior to removal thereof, as presently practiced in conventional motor cooling systems. In this embodiment of the instant invention, the pressure in the downstream motor chamber 90 is preferably maintained above atmospheric pressure to facilitate cooling fluid flow through the exhaust ports.

For ease of maintaining and monitoring the aforementioned pressure differential between chambers 80 and 90, a pair of conventional pressure gauges 150 in fluid communication with the respective chambers may be disposed in ports provided therefor. Additionally, where cooling requirements are such that high pressure shop air is required, a pair of bearing air seals 152 may be disposed circumferentially around the shaft 62 of the rotor 60 at opposed ends thereof for the purpose of protecting the shaft bearings 64 from the deleterious effects of pressurization.

Figure 5:
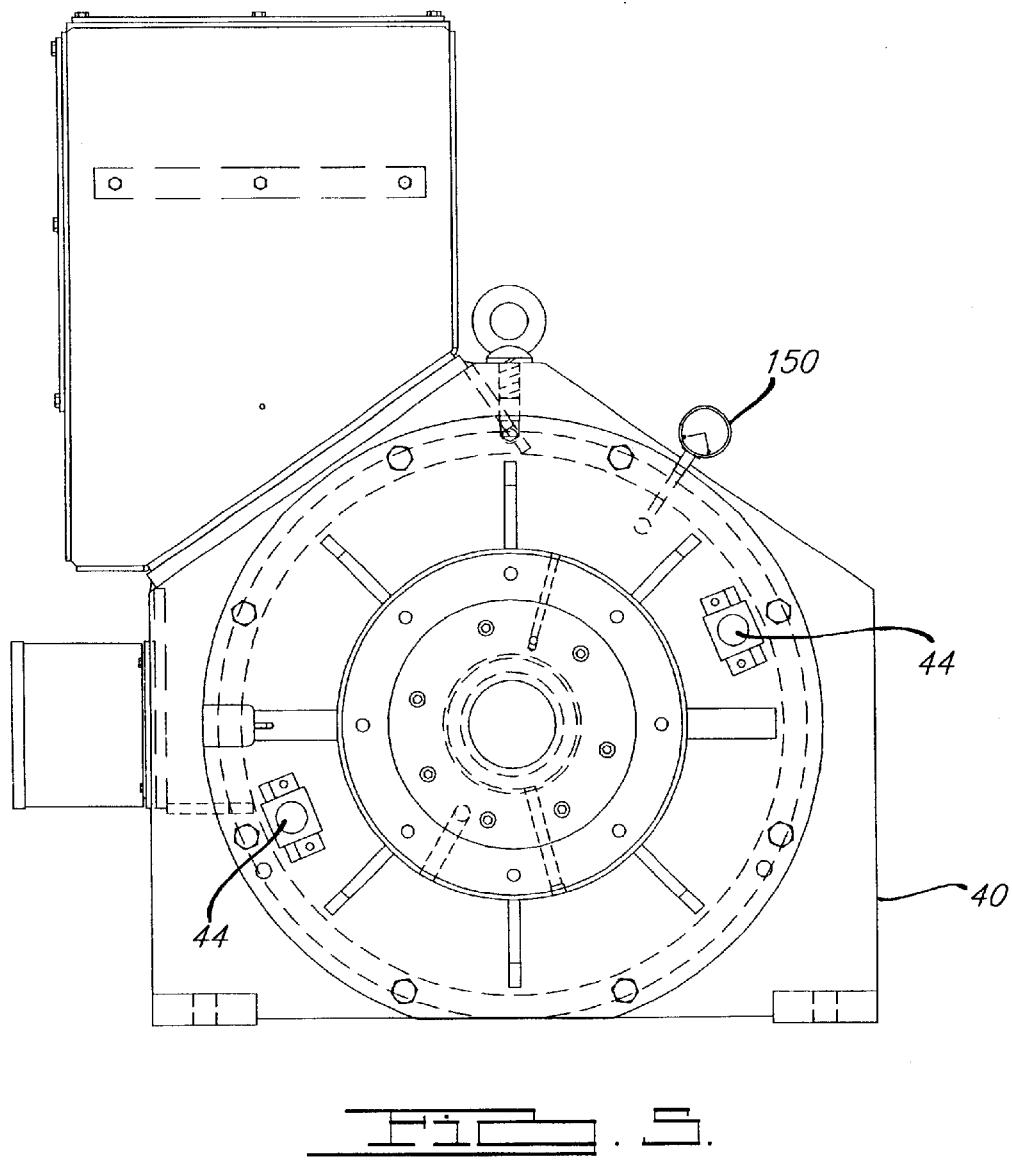
FIG. 5 is a view of the instant invention taken along the line 5—5 of FIG. 1.

The cooling system 10 of the instant invention may also be practiced by providing a plurality of nozzles 100 extending through a plurality of apertures 44 disposed in endplate 40, as shown in FIG. 5. This embodiment of the instant invention permits the introduction of a greater volume of cooling fluid at a plurality of locations radially outwardly of said end turns 76, facilitating heat transfer therefrom. This embodiment of the instant invention is particularly advantageous in high power density motor applications wherein a tremendous amount of heat is generated by the electromagnetic fields in the rotor 60 and stator 70.

In operation, the compressed cooling fluid expands rapidly through the plurality of nozzles, thus providing a dramatic temperature drop. The fluid is initially directed above the end turns 76 of the stator 70, tangentially to the axis of rotation of the rotor 60. The stator end turns 76 form helical channels that provide a path for the cooling fluid thereby effecting excellent heat transfer. The cooling fluid then travels radially inwardly, contacting the surfaces of the rotor end disc 66 proximate the upstream chamber 80. This air path cools the rotor 60 end disc 66 and further cools the shaft 62 thereof. The cooling fluid flowing past the stator end turns 76 is drawn into the gap 72 between the rotor 60 and stator 70 by operation of the positive pressure differential where it attains high velocity due to the rotation of the rotor 60. This cooling fluid transfers heat from the rotor and stator prior to exiting through the exhaust ports 120 or the ducts 140 in fluid communication therewith.

Proper direction and velocity of the cooling fluid through the plurality of nozzles to the large surface area of the stator 70 and rotor 60 assists in keeping the cooling fluid boundary layers turbulent at all times, thereby resulting in superior heat transfer characteristics.

While specific embodiments of the instant invention have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

I claim:

1. A cooling system for an electric motor having a rotor mounted on a shaft and rotatable about a central axis, a stator having a plurality of end turns disposed radially outwardly of said rotor, a generally cylindrical motor frame disposed radially outwardly of said stator, and a pair of end plates at opposed ends of said motor frame comprising:

a fluid nozzle extending through an aperture disposed in a first of said opposed end plates, said nozzle having an inlet disposed externally of said motor for acceptance of a cooling fluid and an outlet disposed internally of said motor oriented to direct said cooling fluid circumferentially proximate the end turns of said stator, wherein said cooling fluid is permitted to rapidly expand through the outlet of said nozzle; and a plurality of exhaust ports disposed in a second of said opposed end plates proximate the radially outward edge thereof for exhausting said cooling fluid from the interior of said motor.

2. The cooling system as claimed in claim 1 further comprising:

a plurality of exhaust ducts having inlets disposed radially outwardly of the end turns of said stator, in fluid communication with said plurality of exhaust ports to direct said cooling fluid proximate the rotor, rotor shaft and stator end turns prior to exiting said motor through said exhaust ports.

3. The cooling system as claimed in claim 1 wherein the cooling fluid is compressed air.

4. The cooling system as claimed in claim 1 wherein the plurality of exhaust ports have a total area that allows a positive pressure differential to be maintained between an upstream chamber of the motor as defined by the area proximate the outlet of said nozzle and a downstream chamber of the motor as defined by the area proximate the exhaust ports thereof, based on a given pressure of cooling fluid, wherein the pressure in the downstream chamber of the motor is greater than atmospheric pressure.

5. The cooling system as claimed in claim 1 further comprising:

a pair of air seals disposed circumferentially around the shaft of said rotor at opposed ends thereof to protect the shaft bearings of said rotor from the effects of pressurization.

6. A cooling system for an electric motor having a rotor mounted on a shaft and rotatable about a central axis, a stator disposed radially outwardly of said rotor, a generally cylindrical motor frame disposed radially outwardly of said stator, and a pair of end plates at opposed ends of said motor frame comprising:

a fluid nozzle extending through an aperture disposed in a first of said opposed end plates, said nozzle having an inlet disposed externally of said motor for acceptance of a cooling fluid and an outlet disposed internally of said motor oriented to direct said cooling fluid circumferentially proximate said motor frame, wherein said cooling fluid is permitted to rapidly expand through the outlet of said nozzle; and a plurality of exhaust ports disposed in a second of said opposed end plates proximate the radially outward edge thereof for exhausting said cooling fluid from the interior of said motor.

7. The cooling system as claimed in claim 6 further comprising:

a plurality of exhaust ducts having inlets disposed radially outwardly proximate said motor frame, in fluid communication with said plurality of exhaust ports to direct said cooling fluid proximate the rotor, rotor shaft and stator prior to exiting said motor through said exhaust ports.

8. The cooling system as claimed in claim 6 wherein the cooling fluid is compressed air.

9. The cooling system as claimed in claim 6 wherein the plurality of exhaust ports have a total area that allows a positive pressure differential to be maintained between an upstream chamber of the motor as defined by the area proximate the outlet of said nozzle and a downstream chamber of the motor as defined by the area proximate the exhaust ports thereof, based on a given pressure of cooling fluid, wherein the pressure in the downstream chamber of the motor is greater than atmospheric pressure.

10. The cooling system as claimed in claim 6 further comprising:

a pair of air seals disposed circumferentially around the shaft of said rotor at opposed ends thereof to protect the shaft bearings of said rotor from the effects of pressurization.

* * * * *